United States Patent [19]

Reilly et al.

[11] Patent Number: 4,889,703

[45] Date of Patent: Dec. 26, 1989

[54] PROCESS FOR PRODUCING TUNGSTOSILICIC ACID

[75] Inventors: Kenneth T. Reilly; Alan D. Douglas; Henry E. Hoffman, all of Towanda, Pa.

[73] Assignee: GTE Products Corporation, Stamford, Conn.

[21] Appl. No.: 368,078

[22] Filed: Jun. 16, 1989

Related U.S. Application Data

[63] Continuation of Ser. No. 131,256, Dec. 7, 1987, abandoned, which is a continuation of Ser. No. 919,998, Oct. 17, 1986, abandoned.

[51] Int. Cl.$^4$ .............................................. C01B 33/20
[52] U.S. Cl. ..................................... 423/326; 210/681
[58] Field of Search ......................... 423/326; 210/681

[56] References Cited

U.S. PATENT DOCUMENTS

| | | | |
|---|---|---|---|
| 2,503,991 | 4/1950 | Bechtold | 423/307 |
| 3,361,518 | 1/1968 | Chiola et al. | 423/326 |
| 3,947,332 | 3/1976 | Vanderpool et al. | 423/326 |
| 4,595,508 | 6/1986 | Wolfe et al. | 210/681 |

Primary Examiner—John Doll
Assistant Examiner—Lori F. Cuomo
Attorney, Agent, or Firm—Donald R. Castle; L. Rita Quatrini

[57] ABSTRACT

A process is disclosed for producing tungstosilicic acid which involves adding sodium silicate to a first solution of sodium tungstate while assuring that the pH of the resulting mixture is from about 2 to about 6, the pH adjustments being made with a cation exchange resin on the hydrogen cycle, to produce a second solution. The solids are removed from the second solution which is digested at a temperature of greater than about 50° C. and then contacted with a cation exchange resin on the hydrogen cycle to produce a third solution which is essentially a tungstosilicic acid solution containing at least about 99% by weight of the starting tungsten as tungstosilicic acid.

5 Claims, No Drawings

PROCESS FOR PRODUCING TUNGSTOSILICIC ACID

This application is a continuation of application Ser. No. 131,256, filed Dec. 7, 1987 which application is a continuation of application Ser. No. 919,998, filed 10/17/86, now abandoned.

This invention relates to a process for producing tungstosilicic acid in which contamination with hydrochloric acid is avoided because a cation exchange resin is used in the pH adjustment steps.

BACKGROUND OF THE INVENTION

Tungstosilicic acid is used in application such as coal gasification.

Prior to this invention, tungstosilicic acid was made using hydrochloric acid in the critical pH adjustment steps. This resulted in chloride contamination of the material and required an extra crystallization step in the process to remove the contaminating chloride ions. This crystallization step in turn resulted in a loss of product to the crystal mother liquor.

The process of the present invention avoids the extra crystallilzation step, the contamination problems and the economic disadvantages of losing product all of which result from use of hydrochloric acid.

SUMMARY OF THE INVENTION

In accordance with one aspect of this invention, there is provided a process for producing tungstosilicic acid which involves adding sodium silicate to a first solution of sodium tungstate while assuring that the pH of the resulting mixture is from about 2 to about 6, the pH adjustments being made with a cation exchange resin on the hydrogen cycle, to produce a second solution. The solids are removed from the second solution which is digested at a temperature of greater than about 50° C. and then contacted with a cation exchange resin on the hydrogen cycle to produce a third solution which is essentially a tungstosilicic acid solution containing at least about 99% by weight of the starting tungsten as tungstosilicic acid.

DETAILED DESCRIPTION OF THE INVENTION

For a better understanding of the present invention, together with other and further objects, advantages and capabilities thereof, reference is made to the following disclosure and appended claims in connection with the above description of some of the aspects of the invention.

This invention relates to a process for efficiently producing tungstosilicic acid without the use of hydrochloric acid in the pH adjustment steps.

Sodium silicate is first added to a first solution of sodium tungstate and the pH is adjusted to from about 2 to about 6 and preferably to from about 3.5 to about 4.5 with a cation exchange resin on the hydrogen cycle to form a second solution. This step is done most typically and most preferably by the following procedure.

The pH of the sodium tungstate solution is adjusted to from about 3.5 to about 4.5 with a cation exchange resin on the hydrogen cycle. The sodium silicate is added preferably and most typically in the form of a sodium silicate solution which is prepared by combining silica with sodium hydroxide and water. The preferred source of the silica is supplied by Cabot Corporation under the trade name Cab-o-sil. The sodium hydroxide and silica are added to water which is heated to about 90° C. and agitated for about ½ hour. Additional sodium hydroxide is added if necessary until a relatively clear solution is attained. The pH of this resulting sodium silicate solution is preadjusted if desired to preferably from about 9.0 to about 9.5 with a cation exchange resin on the hydrogen cycle. It is preferred that the pH of this sodium silicate solution not go below about 9 because insoluble silica forms at a pH slightly less than about 9. The sodium silicate solution is then added to the sodium tungstate solution gradually simultaneously with the resin. When all the sodium silicate solution has been added, the pH is further adjusted if necessary to from about 2 to about 6 and preferably to from about 3.5 to about 4.5 with additional resin to produce the second solution. It is essential that the pH not go above about 6 because above pH 6 the anionic tungsten species that is necessary to subsequently form the tungstosilicic acid does not exist.

Throughout this process the preferred cation exchange resin is a strongly acidic cation exchange resin. Preferred resins are supplied under the trade names of IllCO 211 supplied by the Illinios Water Treatment Company, and Amberlite IR-120, supplied by Rohm and Haas.

At this point any solids such as the resin and any other residual solids are removed from the second solution by standard techniques as filtration.

The second solution is digested at a temperature of greater than about 50° C. and preferably at about 90° C. for a sufficient time which is typically at least about 3 hours to prevent formation of silica gel in the subsequent step when the resulting digested solution is contacted with cation exchange resin. As a result of the prevention of formation of silica gel by the digestion, loss of silicon which is necessary to form the tungstosilicic acid is prevented, and therefore the efficiency of production of tungstosilicic acid is high. Another possible benefit of the digestion is that it possibly may serve to stabilize any tungstosilicic acid which may have already formed.

The resulting digested second solution is then contacted with a cation exchange resin of the type previously described to exchange the sodium ions of the solution with the hydrogen ions of the resin to produce a third solution which is essentially a tungstosilicic acid solution containing at least about 99% by weight of the starting tungsten.

The preferred method of carrying out this step is to use an ion exchange column of the resin and pass the digested second solution through it to produce the tungstosilicic acid solution.

To obtain solid tungstosilicic acid, the tungstosilic acid is crystallized from the third solution.

Details of an especially preferred method of carrying out the process of this invention are set forth in the example that follows.

The process of this invention makes possible production of tungstosilicic acid solution or crystals without use of hydrochloric acid in the pH adjustment steps. Therefore, contamination of the product with chloride is eliminated and there is no need for a purification crystallization step which results in loss of tungsten.

To more fully illustrate this invention, the following non-limiting example is presented.

EXAMPLE

About 180 pounds of sodium tungstate are dissolved in about 110 gallons of deionized water. Strongly acidic cation exchange resin is added to the sodiuum tungstate until the pH measures from about 4.0 to about 4.5. About 2.2 pounds of sodium hydroxide and about 3.3 pounds of Cab-O-Sil are added to about 5 gallons of water in a 50 gallon glass tank and heated to about 90° C. for about ½ hour. More sodium hydroxide is added until a clear solution is attained. Strongly acidic cation resin is added to the resulting sodium silicate solution until a pH of from about 9.0 to about 9.5 is attained. The pH adjusted sodium silicate along with the resin it contains is added to the sodium tungstate solution along with more resin until a pH of the combined solution of about 4.0 is attained. The resulting solution is filtered to remove the resin and solids, and the solids are water washed with about 20 gallons of deionized water to recover any tungsten. The resulting solution is digested at about 90° C. for about 3 hours and then passed through a column containing about 4.5 cubic feet of resin on the hydrogen cycle to produce a tungstosilicic acid solution. The tungstosilicic acid can be evaporated to crystallize tungstosilicic acid crystals. The spent resin can be regenerated by standard techniques which involve generally water washing followed by passing hydrochloric acid of about 2 N HCl until the effluent is acid, followed by thorough washing with water until the effluent is neutral.

While there has been shown and described what are at present considered the preferred embodiments of the invention, it will be obvious to those skilled in the art that various change and modifications may be made therein without departing from the scope of the invention as defined by the appended claims.

What is claimed is:

1. A process for producing tungstosilicic acid, said process consisting essentially of:
   (a) adding sodium silicate to a first solution of sodium tungstate, while assuring that the pH of the resulting mixture is from about 2 to about 6, with the pH adjustments being made with a cation exchange resin on the hydrogen cycle, to form a second solution;
   (b) removing solids from said second solution;
   (c) digesting said second solution at a temperature greater than about 50° C.; and
   (d) contacting the resulting digested solution with a cation exchange resin on the hydrogen cycle to produce a third solution which is essentially a tungstosilicic acid solution, said third solution being produced essentially without formation of silica gel, said third solution containing at least about 99% by weight of the starting tungsten as tungstosilicic acid.

2. A process of claim 1 wherein the pH is adjusted to from about 3.5 to about 4.5.

3. A process of claim 1 wherein said cation exchange resin is a strongly acidic cation exchange resin.

4. A process of claim 1 comprising the additional step of crystallizing tungstosilicic acid from said tungstosilicic acid solution.

5. A process of claim 1 wherein the temperature is about 90° C.

* * * * *